(12) United States Patent
Anderson et al.

(10) Patent No.: US 11,554,980 B2
(45) Date of Patent: Jan. 17, 2023

(54) METHOD AND APPARATUS FOR SUPPRESSING FLOW INSTABILITIES IN AN OPTICAL FIBER DRAW SYSTEM

(71) Applicant: Corning Incorporated, Corning, NY (US)

(72) Inventors: Erling Richard Anderson, Wilmington, NC (US); Tammy Michelle Hoffmann, Wilmington, NC (US); John Michael Jewell, Wilmington, NC (US); Nikolaos Pantelis Kladias, Horseheads, NY (US); Robert Clark Moore, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/470,499

(22) Filed: Sep. 9, 2021

(65) Prior Publication Data

US 2022/0002182 A1    Jan. 6, 2022

Related U.S. Application Data

(62) Division of application No. 16/298,532, filed on Mar. 11, 2019, now Pat. No. 11,198,636.

(Continued)

(51) Int. Cl.
*C03B 37/029* (2006.01)

(52) U.S. Cl.
CPC ........ *C03B 37/029* (2013.01); *C03B 2205/60* (2013.01); *C03B 2205/61* (2013.01);

(Continued)

(58) Field of Classification Search
None
See application file for complete search history.

(56) References Cited

U.S. PATENT DOCUMENTS

| 4,154,592 A | 5/1979 | Bailey |
| 6,381,990 B1 | 5/2002 | Ball et al. |

(Continued)

FOREIGN PATENT DOCUMENTS

| CN | 1500754 A | 6/2004 |
| CN | 1665749 A | 9/2005 |

(Continued)

OTHER PUBLICATIONS

JPH09002832A EPO Machine Translation Performed Aug. 1, 2022. (Year: 2022).*

(Continued)

*Primary Examiner* — Lisa L Herring
(74) *Attorney, Agent, or Firm* — Amy T. Lang; John P. McGroarty

(57) ABSTRACT

A furnace system includes a muffle defining a furnace cavity. A lower heater is coupled to the muffle and is configured to create a hot zone within the furnace cavity having a temperature of about 1900° C. or greater. An upper muffle extension is positioned above the muffle and defines a handle cavity. A downfeed handle is positioned within the handle cavity such that a gap is defined between an outer surface of the downfeed handle and an inner surface of the upper muffle extension. An upper heater is thermally coupled to the upper muffle extension and configured to heat the gap. A gas screen is positioned in the upper muffle extension and is configured to inject a process gas into the handle cavity.

6 Claims, 20 Drawing Sheets

Related U.S. Application Data

(60) Provisional application No. 62/646,584, filed on Mar. 22, 2018.

(52) U.S. Cl.
CPC ...... *C03B 2205/62* (2013.01); *C03B 2205/80* (2013.01); *C03B 2205/91* (2013.01)

(56) References Cited

U.S. PATENT DOCUMENTS

| | | |
|---|---|---|
| 6,668,592 B1 | 12/2003 | Taru et al. |
| 6,735,983 B1 | 5/2004 | Taru et al. |
| 6,810,692 B2 | 11/2004 | Taru et al. |
| 2004/0089025 A1 | 5/2004 | Kuwahara et al. |
| 2010/0207333 A1 | 8/2010 | Otosaka |
| 2014/0096566 A1 | 4/2014 | Otosaka |
| 2015/0321944 A1 | 11/2015 | Yamazaki et al. |
| 2016/0002090 A1 | 1/2016 | Okazaki et al. |

FOREIGN PATENT DOCUMENTS

| | | | |
|---|---|---|---|
| CN | 102643009 A | 8/2012 | |
| CN | 102906040 A | 1/2013 | |
| CN | 103819084 A | 5/2014 | |
| CN | 104556677 A | 4/2015 | |
| CN | 104628250 A | 5/2015 | |
| CN | 104981438 A | 10/2015 | |
| EP | 0386756 A1 | 9/1990 | |
| EP | 0416614 A1 | 3/1991 | |
| EP | 2022766 A2 | 2/2009 | |
| GB | 2361472 A | 10/2001 | |
| JP | 01-130032 A | 5/1989 | |
| JP | 04-228420 A | 8/1992 | |
| JP | 05-170038 A | 7/1993 | |
| JP | 09-002832 A | 1/1997 | |
| JP | 09-020528 A | 1/1997 | |
| JP | 09002832 A * | 1/1997 | ........... C03B 37/029 |
| JP | 09-202637 A | 8/1997 | |
| JP | 10-130032 A | 5/1998 | |
| JP | 2000-053440 A | 2/2000 | |
| JP | 2000-154034 A | 6/2000 | |
| JP | 2002-068773 A | 3/2002 | |
| JP | 2004-142988 A | 5/2004 | |
| JP | 2011-046563 A | 3/2011 | |
| JP | 2013-151393 A | 8/2013 | |
| JP | 2013-151395 A | 8/2013 | |
| JP | 2015-093815 A | 5/2015 | |
| RU | 2335465 C2 | 10/2008 | |
| WO | 99/51534 A1 | 10/1999 | |
| WO | 2018/022316 A1 | 2/2018 | |

OTHER PUBLICATIONS

Boll et al., "Large Optical Fiber Draw Furnace Developments", Proc. 59th ICWS/IICIT, 2010, pp. 335-339.

Boll et al; "Large Optical Fiber Draw Furnace Developments"; Proc. 59th ICWS/IICIT, pp. 335-339, 2010.

European Patent Application No. 19164631.4 Search Report and Search Opinion dated Jun. 24, 2019; 4 Pages; European Patent Office.

Korpela et al., "Stability of the conduction regime of natural convection in a tall vertical annulus", J. Fluid Mech., vol. 99, part 4, 1980, pp. 725-738.

Search Report and Written Opinion for NL2020854; 10 Pages; dated Jan. 22, 2019.

Russian Patent Application No. 2020134455, Notice of Allowance, dated Apr. 19, 2022; 07 pages; Russian Patent Office.

Chinese Patent Application No. 201980021205.9, Office Action, dated Apr. 15, 2022, 14 pages (7 pages of English Translation and 7 pages of Original Document), Chinese Patent Office.

* cited by examiner

US 11,554,980 B2

METHOD AND APPARATUS FOR SUPPRESSING FLOW INSTABILITIES IN AN OPTICAL FIBER DRAW SYSTEM

This application is a divisional of and claims the benefit of priority of U.S. patent application Ser. No. 16/298,532, filed on Mar. 11, 2019, which claims the benefit of priority to Dutch Patent Application No. 2020854, filed on 1 May 2018, which claims the benefit of priority to U.S. Provisional Application Ser. No. 62/646,584 filed on Mar. 22, 2018, the content of which is relied upon and incorporated herein by reference in its entirety.

FIELD OF THE DISCLOSURE

The present disclosure generally relates to a fiber draw system, and more specifically, to a method and system for suppressing flow instabilities in the fiber draw system.

BACKGROUND

Helium gas is used in various stages of conventional fiber manufacturing processes. For some manufacturing processes, a large fraction of the consumption of helium is in the fiber draw furnace where active purging of the furnace with an inert gas is required to prevent air entrainment and oxidation of the hot components. Helium is a nonrenewable resource recovered as a byproduct from natural gas wells. As the price of helium is projected to increase in the future, and supply shortages disrupt fiber production, removing and/or reusing helium from the fiber draw furnace may be advantageous. Recycling of helium from the fiber draw furnace increases operational complexity to collect, clean, and reuse the draw furnace helium. Use of other inert gases in the fiber draw furnace, like nitrogen and argon, may be cheaper than helium but often result in unacceptable fiber diameter variation. Consequently there is a need to provide methods and apparatuses that will allow drawing of fiber within specifications without the use of helium in the fiber draw furnace.

SUMMARY OF THE DISCLOSURE

According to at least one embodiment of the present disclosure, a furnace system includes a muffle defining a furnace cavity. A lower heater is coupled to the muffle and is configured to create a hot zone within the furnace cavity having a temperature of about 1900° C. or greater. An upper muffle extension is positioned above the muffle and defines a handle cavity. A downfeed handle is positioned within the handle cavity such that a gap is defined between an outer surface of the downfeed handle and an inner surface of the upper muffle extension. An upper heater is thermally coupled to the upper muffle extension and configured to heat the gap. A gas screen is positioned in the upper muffle extension and is configured to inject a process gas into the handle cavity.

According to at least one embodiment of the present disclosure, a furnace system includes a muffle defining a furnace cavity. An upper muffle extension is positioned above the muffle. A gas screen is positioned in the upper muffle extension and is configured to inject a process gas. A downfeed handle is positioned within the upper muffle extension such that a gap is defined between an outer surface of the downfeed handle and an inner surface of the upper muffle extension. The gap has a length as measured from the downfeed handle to the upper muffle extension of about 4 cm or less. A boule is coupled to the downfeed handle and is configured to support an optical fiber preform. An upper heater is coupled to the upper muffle extension and is configured to heat the gap.

According to at least one embodiment of the present disclosure, a method of operating a furnace assembly, comprising the steps of: positioning a downfeed handle within an upper muffle extension such that a gap is defined between an outer surface of the downfeed handle and an inner surface of the upper muffle extension; heating the upper muffle extension through an upper heater thermally coupled to the upper muffle extension; and injecting a process gas through a gas screen around the downfeed handle.

These and other features, advantages, and objects of the present disclosure will be further understood and appreciated by those skilled in the art by reference to the following specification, claims, and appended drawings.

According to a first aspect, a furnace system is provided that includes a muffle defining a furnace cavity. A lower heater is coupled to the muffle and is configured to create a hot zone within the furnace cavity having a temperature of about 1900° C. or greater. An upper muffle extension is positioned above the muffle and defines a handle cavity. A downfeed handle is positioned within the handle cavity such that a gap is defined between an outer surface of the downfeed handle and an inner surface of the upper muffle extension. An upper heater is thermally coupled to the upper muffle extension and configured to heat the gap. A gas screen is positioned in the upper muffle extension and is configured to inject a process gas into the handle cavity.

According to a second aspect, the furnace system of aspect 1 is provided, wherein the process gas comprises about 10% or more by volume of argon.

According to a third aspect, the furnace system of aspect 1 is provided, wherein the process gas comprises about 10% or more by volume of nitrogen.

According to a fourth aspect, the furnace system of aspect 1 is provided, wherein the downfeed handle further comprises a boule, and wherein the boule is configured to support an optical fiber preform.

According to an aspect, the furnace system of aspect 1 is provided, wherein a shroud is positioned between the upper muffle and preform.

According to a fifth aspect, the furnace system of aspect 1 is provided, wherein the upper heater is configured to heat the gap to a temperature of about 800° C. or greater.

According to a sixth aspect, the furnace system of aspect 1 is provided, wherein the gap has a length as measured from the outer surface of the downfeed handle to the inner surface of the upper muffle extension of about 2 cm or less.

According to a seventh aspect, the furnace system of aspect 1 is provided, wherein the upper heater is thermally coupled at an entrance of the upper muffle extension.

According to an eighth aspect, the furnace system is provided that includes a muffle defining a furnace cavity. An upper muffle extension is positioned above the muffle. A gas screen is positioned in the upper muffle extension and is configured to inject a process gas. A downfeed handle is positioned within the upper muffle extension such that a gap is defined between an outer surface of the downfeed handle and an inner surface of the upper muffle extension. The gap has a length as measured from the downfeed handle to the upper muffle extension of about 4 cm or less. The downfeed handle is configured to support an optical fiber preform. An upper heater is coupled to the upper muffle extension and is configured to heat the gap.

According to a ninth aspect, the furnace system of aspect 8 is provided, wherein at least one of the muffle and upper muffle extension comprises carbon.

According to a tenth aspect, the furnace system of aspect 8 is provided, wherein the length of the gap is about 3 cm or less as measured from the outer surface of the downfeed handle to the inner surface of the upper muffle extension.

According to an eleventh aspect, the furnace system of aspect 8 is provided, wherein the length of the gap is about 2.5 cm or less as measured from the outer surface of the downfeed handle to the inner surface of the upper muffle extension.

According to a twelfth aspect, the furnace system of aspect 8 is provided, wherein the length of the gap is about 2 cm or less as measured from the outer surface of the downfeed handle to the inner surface of the upper muffle extension.

According to a thirteenth aspect, the furnace system of aspect 8 is provided, wherein the process gas comprises an inert gas.

According to a fourteenth aspect, the furnace system of aspect 13 is provided, wherein the process gas comprises at least one of nitrogen and argon.

According to a fifteenth aspect, a method of operating a furnace assembly, comprising the steps of: positioning a downfeed handle within an upper muffle extension such that a gap is defined between an outer surface of the downfeed handle and an inner surface of the upper muffle extension; heating the upper muffle extension through an upper heater thermally coupled to the upper muffle extension; and injecting a process gas through a gas screen around the downfeed handle.

According to a sixteenth aspect, the method of aspect 15 is provided, wherein the step of injecting a process gas further comprises: injecting at least one of nitrogen and argon through the gas screen around the downfeed handle.

According to a seventeenth aspect, the method of aspect 15 further comprises, creating a hot zone within the a furnace cavity having a temperature of about 1900° C. or greater.

According to an eighteenth aspect, the method of aspect 15 further comprises, supporting an optical fiber preform from the downfeed handle; and drawing an optical fiber from the optical fiber preform.

According to a nineteenth aspect, the method of aspect 15 is provided, wherein the step of heating the upper muffle extension further comprises the step of heating the gap to a temperature in the range of about 800° C. to about 1100° C.

According to a twentieth aspect, the method of aspect 15 is provided, wherein the step of positioning the downfeed handle within the upper muffle extension further comprises defining the gap such that the gap has a length of from about 0.5 cm to about 2.5 cm between an outer surface of the downfeed handle and the inner surface of the upper muffle extension.

Each of the aspects and embodiments described herein may be combined with each other in various ways.

DETAILED DESCRIPTION

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Figure 1:
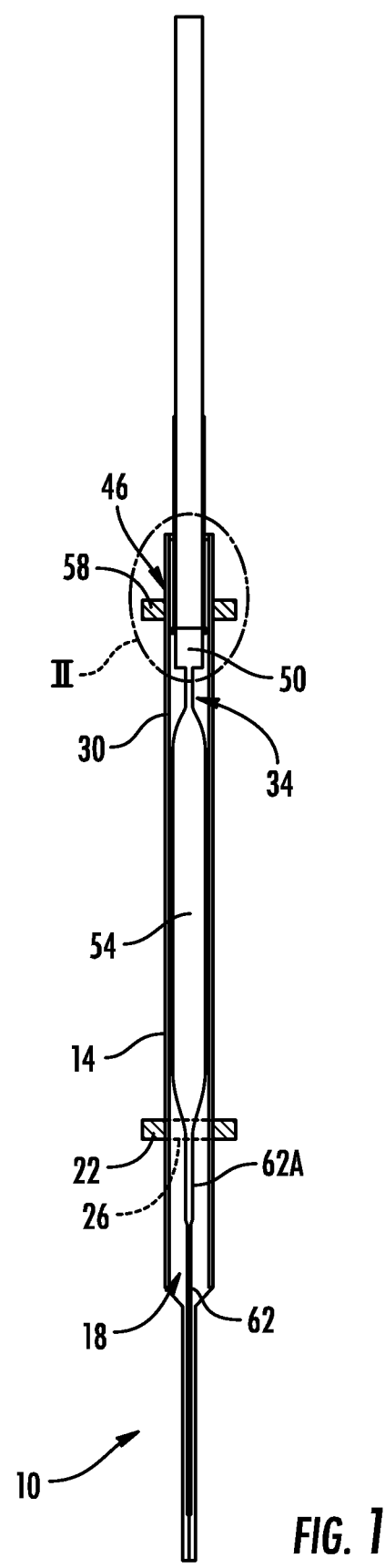
FIG. 1 is a schematic diagram illustrating a furnace assembly, according to at least one example.
Figure 2:
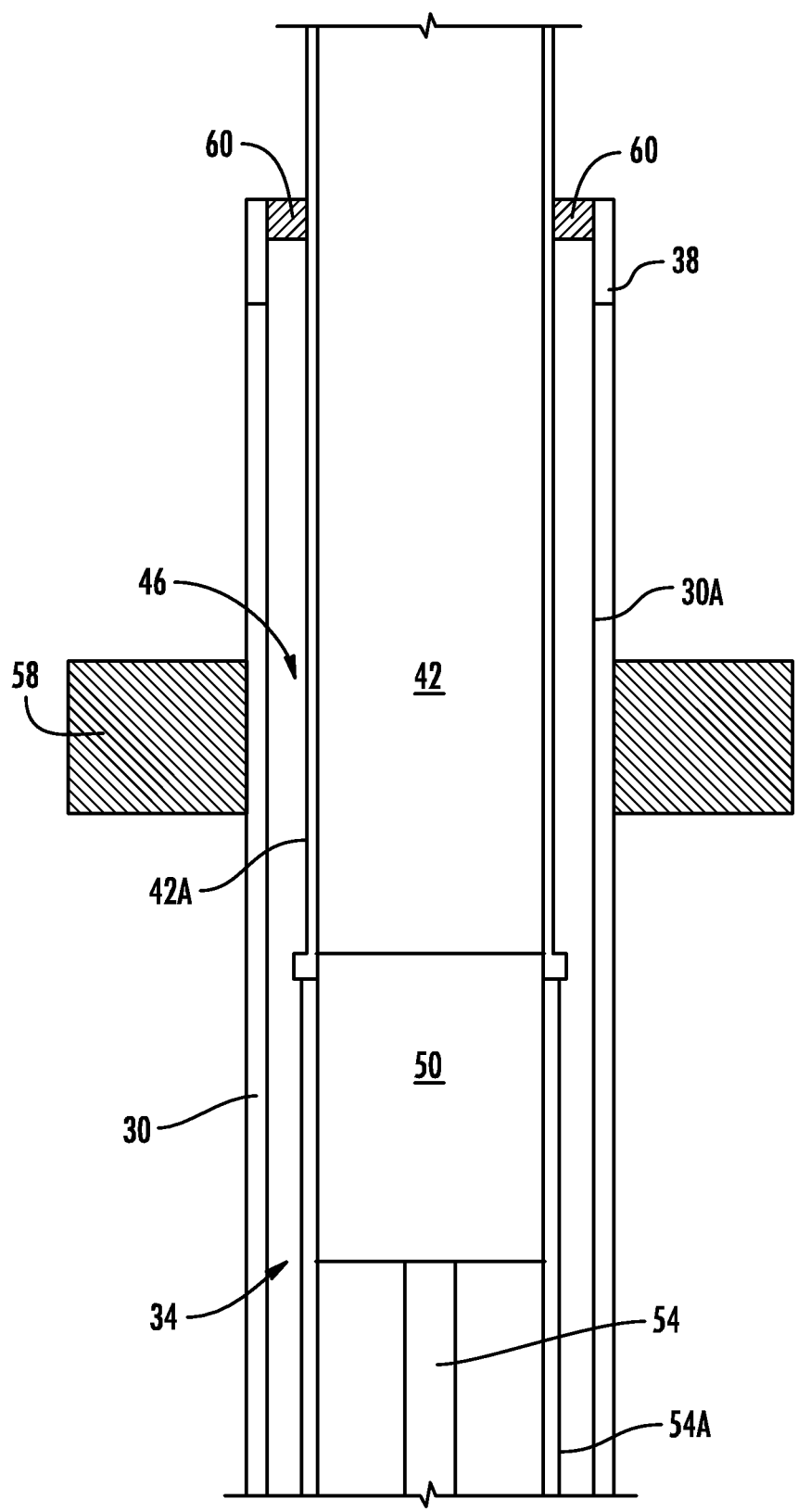
FIG. 2 is an enhanced view taken at section II of FIG. 1, according to one embodiment.

Referring to FIGS. 1 and 2, a furnace system 10 is schematically shown. The furnace system 10 includes a muffle 14 defining a furnace cavity 18 therein. A lower heater 22 is coupled to the muffle 14 and is configured to create a hot zone 26 within the furnace cavity 18. An upper muffle extension 30 is positioned within the furnace system 10 and above the muffle 14. The upper muffle extension 30 defines a handle cavity 34 therein. A gas screen 38 is positioned within the upper muffle extension 30 and is configured to inject a process gas into the handle cavity 34. A downfeed handle 42 is positioned within the upper muffle extension 30 such that a gap 46 is defined between an outer surface 42A of the downfeed handle 42 and an inner surface 30A of the upper muffle extension 30. Downfeed handle 42 is configured to support an optical fiber preform 54. Downfeed handle 42 optionally includes a boule 50 that supports an optical fiber preform 54. An upper heater 58 is coupled to the upper muffle extension 30 to heat the gap 46.

The muffle 14 and/or upper muffle extension 30 may be composed of a refractory material such as graphite, zirconia, binders and/or combinations thereof. As such, one or more of the muffle and upper muffle extension may include carbon. The muffle 14 and upper muffle extension 30 may be configured to retain heat within the furnace system 10 as well as protect other components from excess temperatures. Although the materials of the muffle 14 and/or upper muffle extension 30 may generally be good insulators, oxidation may occur at elevated temperatures. As such, one or more process gases may be inserted or injected into the furnace assembly 10 to prevent oxidation of the muffle 14 and/or upper muffle extension 30. Although described as separate structures, it will be understood that the muffle 14 and the upper muffle extension 30 may be a single component or composed of more than two components. The muffle 14 and/or the upper muffle extension 30 may have a substantially uniform inner diameter, or the inner diameter may be constant throughout. Further, the muffle 14 and the upper muffle extension 30 may have different inner diameters than one another.

The lower heater 22 is thermally coupled to the muffle 14 and is configured to create the hot zone 26 within the furnace system 10. Specifically, the hot zone is generated within the furnace cavity 18. The hot zone 26 may have a temperature of from about 1800° C. to about 2000° C. As such, the hot zone 26 may have a temperature which is elevated relative to the rest of the furnace cavity 18 and/or the handle cavity 34. For example, the hot zone 26 may have a temperature of about 1700° C., 1800° C., 1900° C., or about 2000° C., or any range having any two of these values as endpoints. In some examples, the hot zone 26 may have a temperature of about 1900° C. or greater. As will be explained in greater detail below, the heat of the hot zone 26 is sufficient to decrease the viscosity of the optical fiber preform 54.

The upper muffle extension 30 is coupled to the muffle 14. The upper muffle extension 30 may be an annular structure defining the handle cavity 34 therein. The handle cavity 34 is fluidly coupled and is open to the furnace cavity 18. As such, gases within the handle cavity 34 may pass or flow into the furnace cavity 18. The handle cavity 34 is sized and positioned to receive the downfeed handle 42. A seal 60 is positioned between gas screen 38 and the downfeed handle 42 such that gas may not escape upwardly from the handle cavity 34. The downfeed handle 42 may be hollow or solid. The downfeed handle 42 may have an outside diameter of from about 6 cm to about 15 cm, or from about 7 cm to about 13 cm, or from about 8 cm to about 12 cm. The downfeed handle 42 is coupled to a motor which allows the handle 42 to move in and out of the handle cavity 34 of the upper muffle extension 30. As will be explained in greater detail below, the downfeed handle 42 may move through the upper muffle extension 30 such that as the optical fiber preform 54 is consumed, the handle 42 may continuously move the optical fiber preform 54 into the hot zone 26. The boule 50 is coupled to a downward or distal end of the rest of downfeed handle 42. Boule 50 is a component of the downfeed handle 42. According to various examples, the boule 50 is configured to support the optical fiber preform 54. According to various examples, the boule 50 may have a substantially similar outside diameter to the downfeed handle 42. In other words, an exterior surface of the boule 50 may be substantially flush with the outer surface 42A of the downfeed handle 42. As the boule 50 has substantially the same outside diameter as the downfeed handle 42, the gap 46 may remain substantially constant as the boule 50 is moved through the upper muffle extension 30. In the embodiment illustrated in FIG. 2, boule 50 is a piece of glass welded to handle 42. Boule 50 includes a slot to which optical fiber preform 54 is attached. But, any suitable configuration may be used to attach optical fiber preform 54 to downfeed handle 42, and there may or may not be a boule 50. As the downfeed handle 42 is moved in and out of the handle cavity 34, the boule 50 and optical fiber preform 54 are moved through the handle cavity 34 and into the furnace cavity 18. In cases where optical fiber preform 54 attachment to downfeed handle 42 has a smaller diameter than the downfeed handle 42 or boule 50, a shroud 54A surrounding 54 can be used to reduce the gap between attachment 54 and the upper muffle extension 30. The shroud 54A can be attached to the downfeed handle 42, the boule 50, or the preform.

The optical fiber preform 54 may be constructed of any glass or material and may be doped suitable for the manufacture of optical fibers. According to various examples, the optical fiber preform 54 may include a core and a cladding. As the optical fiber preform 54 reaches the hot zone 26, the viscosity of the optical fiber preform 54 is lowered such that an optical fiber 62 may be drawn therefrom. The optical fiber 62 is drawn from a draw root 62A of the optical fiber preform 54. The draw root 62A is proximate the hot zone 26. As the optical fiber preform 54 is consumed through the production of the optical fiber 62, the downfeed handle 42 may continuously lower such that new portions of the optical fiber preform 54 are exposed to the hot zone 26. The optical fiber 62 is drawn from the optical fiber preform 54 out through a bottom of the furnace assembly 10 and may be wound onto a spool.

The upper heater 58 is thermally coupled to the upper muffle extension 30. For purposes of this disclosure, the term "thermally coupled" means that the upper heater 58 is positioned at a location which is configured to heat the gap 46. Different places where the upper heater 58 may be coupled include proximate an entrance of the upper muffle extension 30 and/or include at other locations along the axial dimension of the upper muffle extension 30. In some examples, the upper heater 58 may extend across a portion, a majority or substantially all of the axial dimension of the upper muffle extension 30. As such, the upper heater 58 is positioned above the hot zone 26 of the furnace cavity 18. The upper heater 58 may extend around a portion, a majority, or substantially all of a circumference of the upper muffle extension 30. In conventional fiber draw applications, upper muffles may be passively heated due to convection and conduction from the hot zone. According to the present disclosure, the upper muffle extension 30 is actively heated by the upper heater 58. In other words, the upper heater 58 is configured to heat the handle cavity 34 as well as the gap 46 present between the upper muffle extension 30 in the downfeed such that the furnace system 10 is actively heated above the hot zone 26. The upper heater 58 is configured to heat the handle cavity 34 and/or the gap 46 to a temperature in the range of about 600° C. to about 1800° C., or from about 700° C. to about 1500° C., or from about 800° C. to about 1100° C. For example, the upper heater 58 is configured to heat the gap 46 to a temperature of about 800° C. or greater. In traditional fiber draw designs, upper cavities may only reach a temperature of between about 150° C. to about 250° C., or about 200° C. to about 250° C. based on convection of heat upward from heaters positioned lower in the furnace. As will be explained in greater detail below, active heating of the upper muffle extension 30, handle cavity 34 and/or the gap 46 by the upper heater 58 may prevent flow instabilities which are generated due to temperature and density stratification in the upper volume of the furnace system 10.

As explained above, the downfeed handle 42 is positioned within upper muffle extension 30 such that the gap 46 is defined between the outer surface 42A of the downfeed handle 42 and the inner surface 30A of the upper muffle extension 30. It will be understood that the gap 46 may further be defined between the boule 50 and the upper muffle extension 30 as the boule 50 is moved through the upper muffle extension 30. The gap 46 has a length, as measured from the outer surface 42A of the downfeed handle 42 to the inner surface 30A of the upper muffle extension 30, of about 4 cm or less, about 3.5 cm or less, about 3 cm or less, about 2.5 cm or less, about 2 cm or less, about 1.5 cm or less, about 1 cm or less, or about 0.5 cm or less. The length of the gap 46 may be substantially uniform or may vary around the circumference of the downfeed handle 42. Unless otherwise specified, in examples where the gap 46 is non-uniform around the circumference of the downfeed handle 42, the length of the gap 46 is measured as the minimum distance of the gap 46. Further, the length of the gap 46 may be constant or changing over the axial dimension of the downfeed handle 42 and/or the upper muffle extension 30. In yet further examples, the length of the gap 46 may vary in a time-dependent manner. For example, the length of the gap 46 may change as the optical fiber preform 54 is consumed and the downfeed handle 42 moves through the upper muffle extension 30. While the "length" of gap 46 may be conventionally thought of as a "width," it is referred to herein as a "length" for consistency with how the term length is used in the Grashhof equation.

The gas screen 38 is positioned within or coupled to the upper muffle extension 30. The gas screen 38 is configured to inject, release or otherwise insert one or more process gases into the handle cavity 34. Gas screen 38 includes at least one opening (not shown in FIG. 2) through which process gas is injected into gap 46. Gas screen 38 may include a single inlet port, a plurality of inlet ports and/or a continuous or semi-continuous opening configured to inject the process gas. It will be understood that the gas screen 38 may include one or more gratings configured to modify flow characteristics of the process gas. The process gas may be injected in a single location or at a plurality of locations. The process gases may travel into the handle cavity 34, to the furnace cavity 18, around the optical fiber preform 54 and out of the furnace system 10. The process gases may include one or more gases which are inert to the upper muffle extension 30, the muffle 14, the optical fiber preform 54 and/or other components of the furnace system 10. For example, the process gas may include helium, argon, nitrogen, and/or other inert gases. The process gas may include at least one of nitrogen and argon. Inert examples of the process gases may be advantageous in preventing oxidation and/or damage from occurring to components of the furnace assembly 10. Process gases may contain between about 1% and about 100% by volume argon. In a specific example, the process gas may contain about 10% or more by volume of argon. The process gas may contain between about 1% and about 100% by volume of nitrogen. In a specific example, the process gas may contain about 10% or more by volume of nitrogen. It will be understood that the process gas may include one or more different gases. The gas screen 38 may inject the process gas at a rate of between about 5 standard liters per minute (SLPM) and about 40 SLPM. In specific examples, the gas screen 38 may inject the process gas at a flow rate of about 18 SLPM, 19 SLPM, 20 SLPM, 21 SLPM, 22 SLPM, 23 SLPM, 24 SLPM, or any range having any two of these values as endpoints. As explained in greater detail below, the kinematic viscosity of the process gas may affect the diameter of the optical fiber 62 drawn from the optical fiber preform 54. As such, selection of the process gas used may be dependent on a variety of parameters of the furnace system 10 such as the length of the gap 46. Helium may have a kinematic viscosity of about 1.180 cm$^2$/sec at 1 atm of pressure and a temperature of 20° C. Nitrogen may have a kinematic viscosity of about 0.151 cm$^2$/sec at 1 atm of pressure and a temperature of 20° C. Argon may have a kinematic viscosity of about 0.134 cm$^2$/sec at 1 atm of pressure and a temperature of 20° C.

The type of process gas used, along with the convective forces generated by the lower heater 22, may generate flow instabilities in the process gas resulting in a non-uniform diameter of the optical fiber 62 drawn from the optical fiber preform 54. The flow instabilities may arise from the interaction between natural convective flow (e.g., from process gas heated by the lower heater 22) due to the density stratification in the handle cavity 34 and the process gas injected into the handle cavity 34 through gas screen 38. The flow instabilities that are generated in the handle cavity 34 are propagated down to the furnace cavity 18 and affect the heat transfer between the process gas and the draw root 62A of the optical fiber preform 54 located in the hot zone 26 of the muffle 14. The flow instabilities may be manifested as temperature variations, pressure variations and mass flow variations. The temperature, pressure and mass flow variations are translated to the draw root 62A which causes changes in viscosity of the optical fiber preform 54. Ultimately, the temperature, pressure and mass flow variations lead to fluctuations in the heating and cooling of the draw root 62A which ultimately results in the fluctuation of the diameter of the optical fiber 62 drawn from the optical fiber preform 54 (e.g., due to changes in the amount of material which may be pulled from the optical fiber preform 54). The flow instabilities, or turbulence, of the process gas may be quantified as a Grashof (Gr) number. The Gr number can be interpreted physically as the ratio of the buoyancy forces to the viscous forces of a gas system. When buoyancy forces become significantly larger than the viscous forces, flow becomes unstable and temporally-variant. The Grashof number is expressed numerically by equation (1):

$$Gr = \frac{g\beta L_c^3 \Delta T}{\nu^2} \quad (1)$$

where, g is the gravitational acceleration, β is the coefficient of thermal expansion of the process gas, $L_c$ is the characteristic length (e.g., the length of the gap 46), ΔT is the temperature difference (e.g. as measured proximate the draw root 62A of the optical fiber preform 54 to the gas screen 38) and ν is the kinematic viscosity of the process gas. Conventional fiber draw furnaces use helium as helium has a high kinematic viscosity. As can be seen from equation (1), a high kinematic viscosity of the process gas may lead to a lower Grashof number which results in lower natural convective flow. Interpreted physically, higher kinematic viscosity process gases resist convective flow. In other words, the higher the kinematic viscosity of the process gas, the more resistance to convective flow is provided by the process gas. When the convective flow is resisted, the process gas may flow uniformly from the handle cavity 34 into the furnace cavity 18. When the convective flow is present, the process gas may tend to undergo a transition to a multicellular pattern which drifts upward in the furnace system 10 which results in a buffering, or repeated generation, of temperature, pressure and mass flow variations of the process gas. Furnace system 10 may be tailored to use a particular gas by adjusting the characteristic length (e.g., the length of the gap 46) and/or the temperature difference (e.g., by using the upper heater 58) to reduce the Grashof number to promote stable flow of the process gas thereby reducing fiber diameter variation. This tailoring may allow the use of process gases other than helium while still obtaining a desirably low Grashof number and stable flow.

Figure 8A:
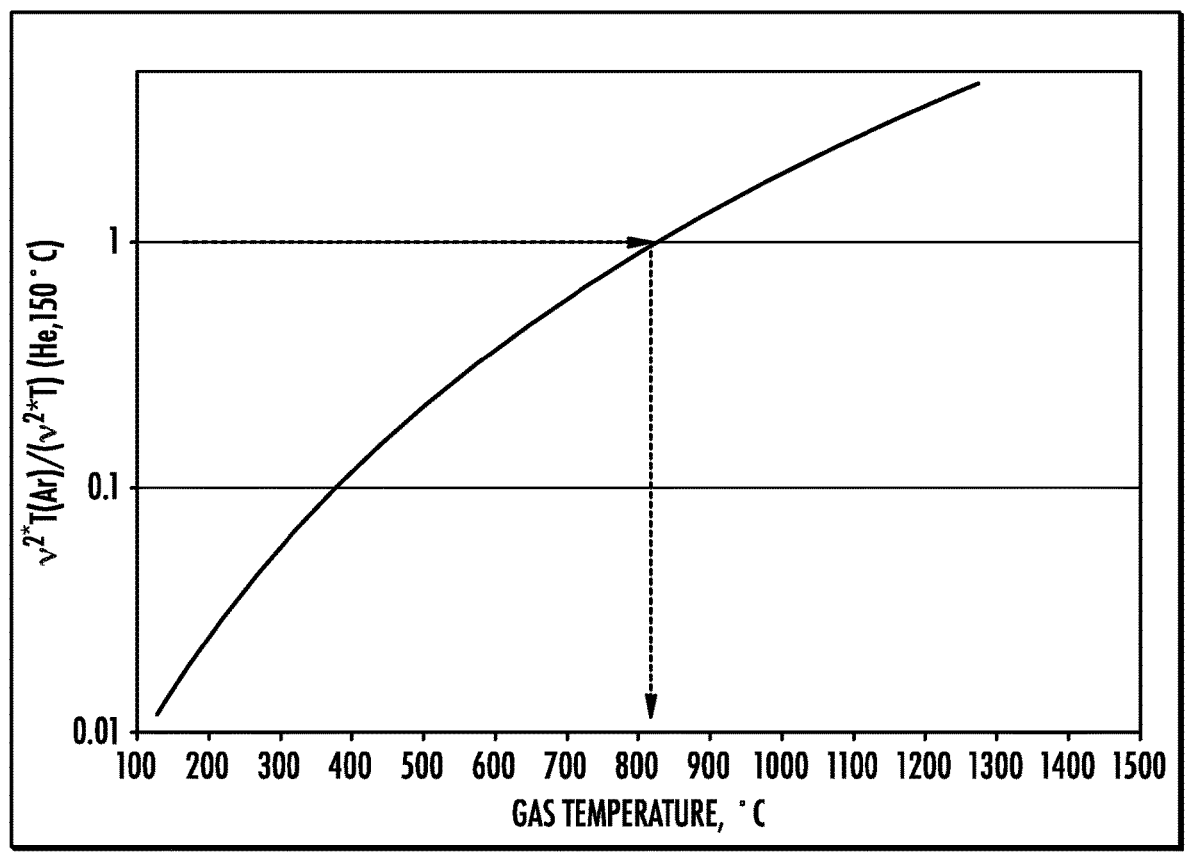
FIG. 8A is a plot of the ratio of the ratio of the square of kinematic viscosity for Argon to that of Helium at 150° C. vs. temperature.
Figure 8B:
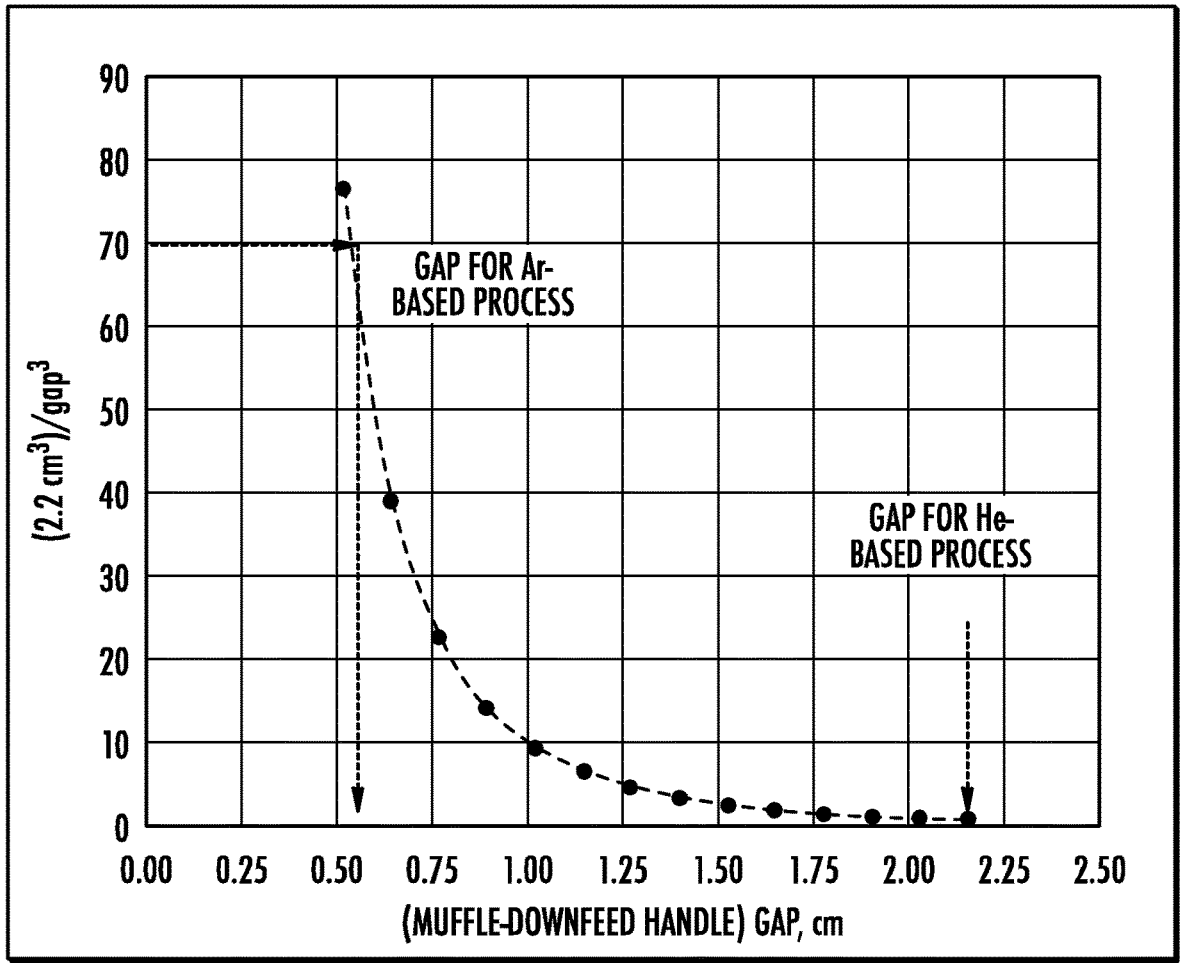
FIG. 8B shows the amount the characteristic length must be reduced to maintain constant Gr number when He is replaced by Ar.

Referring to FIG. 8A and FIG. 8B, the impact of temperature on kinematic viscosity and the furnace gap on convective flow resistance is illustrated. FIG. 8A is the ratio of the square of kinematic viscosity for Argon to that of Helium at 150° C. (the normal gas temperature in the upper muffle) as a function of the temperature of Argon. At a ratio of 1, these two factors are equal, i.e., for a given furnace construction the resistance to convective flow of Argon is the same as that for Helium. FIG. 8A shows that a temperature of 800° C. Referring to FIG. 8B, the impact of furnace gap is illustrated. This is the analogous Figure to the dependency shown in FIG. 8A. It shows the amount the gap must be reduced to maintain constant Gr number when He is replaced by Ar (with no increase in muffle temperature). A 70× increase in $1/(gap)^3$ is required because $v^2(He)/v^2(Ar)$ =70 at 150° C.

Figure 3:
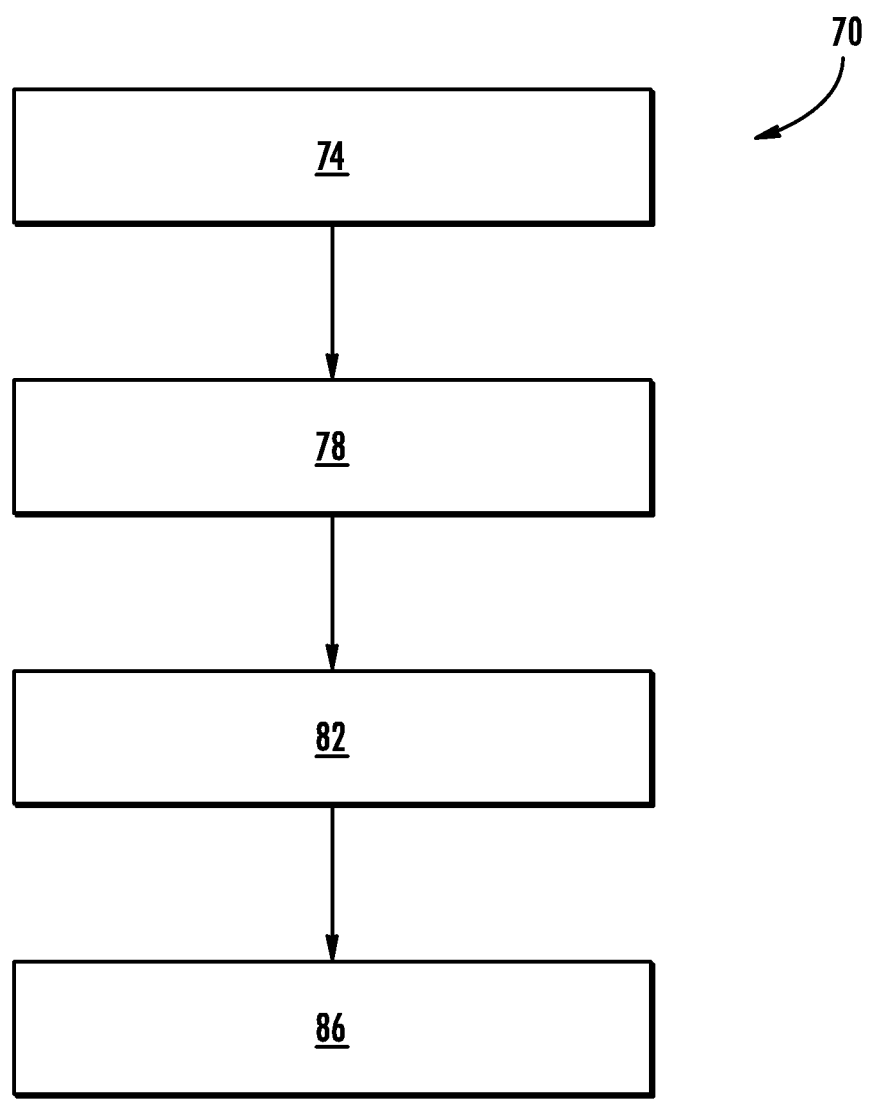
FIG. 3 is a flowchart for carrying out a method, according to at least one example.
Figure 4A:
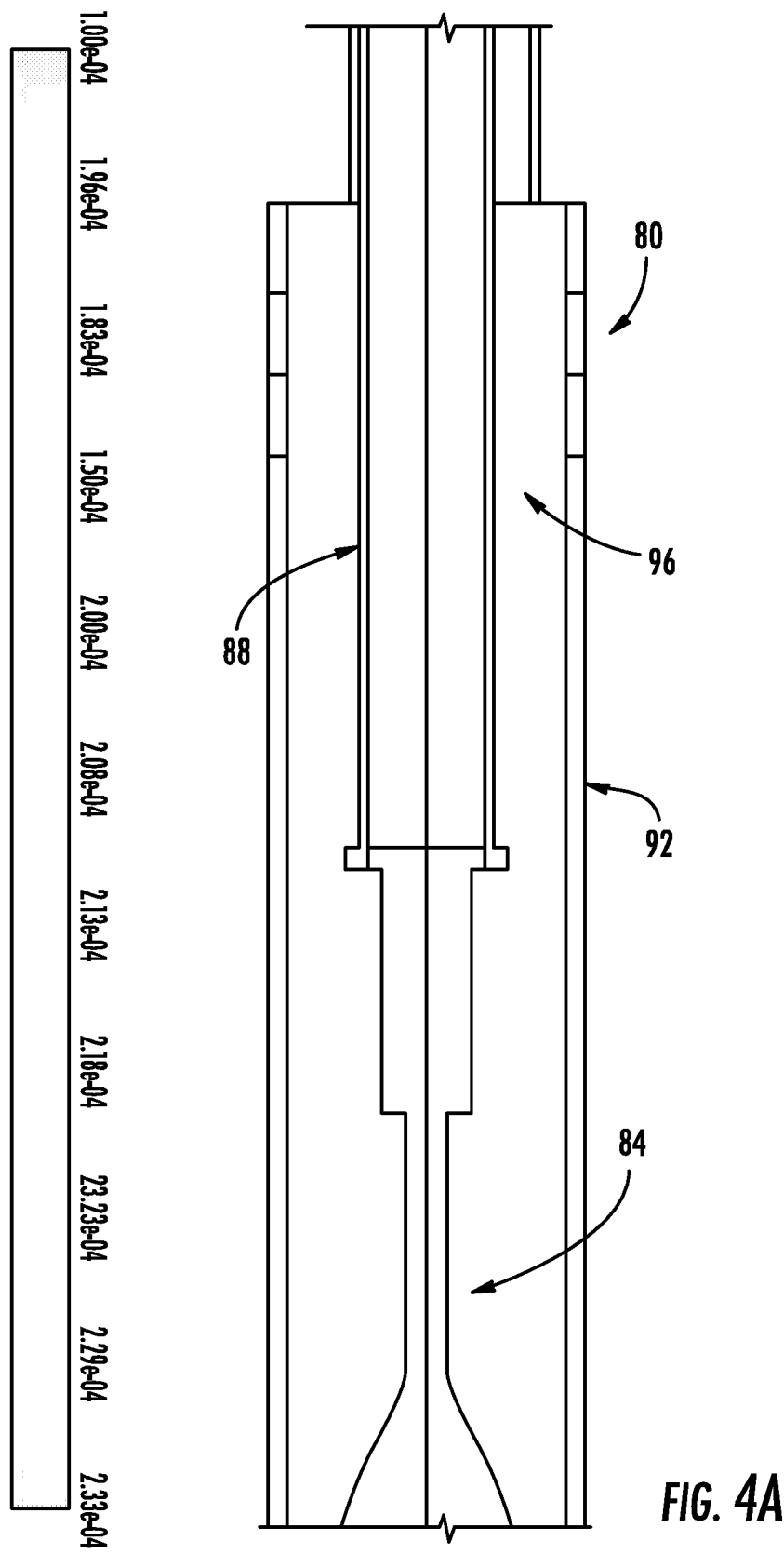
FIG. 4A is a flow path diagram of a first comparative example.
Figure 4B:
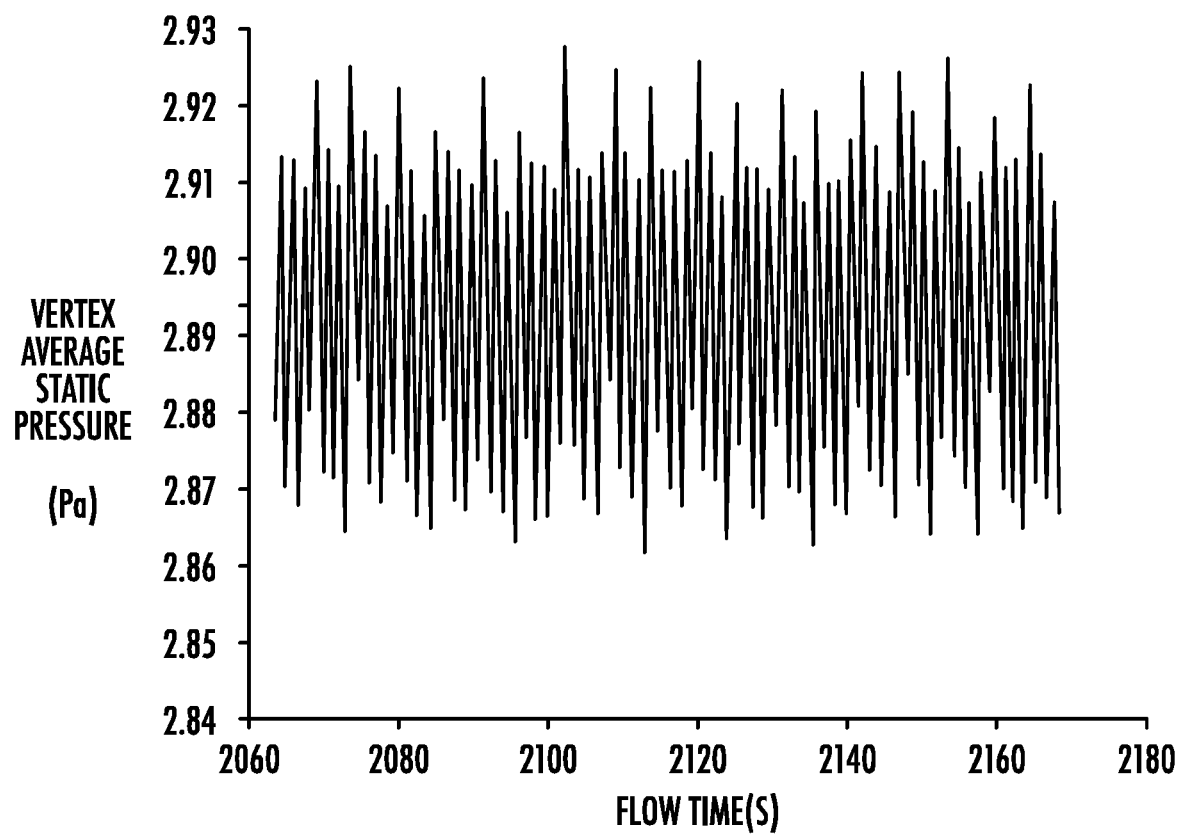
FIG. 4B is a plot of vertex average static pressure vs. flow time for the first comparative example.
Figure 4C:
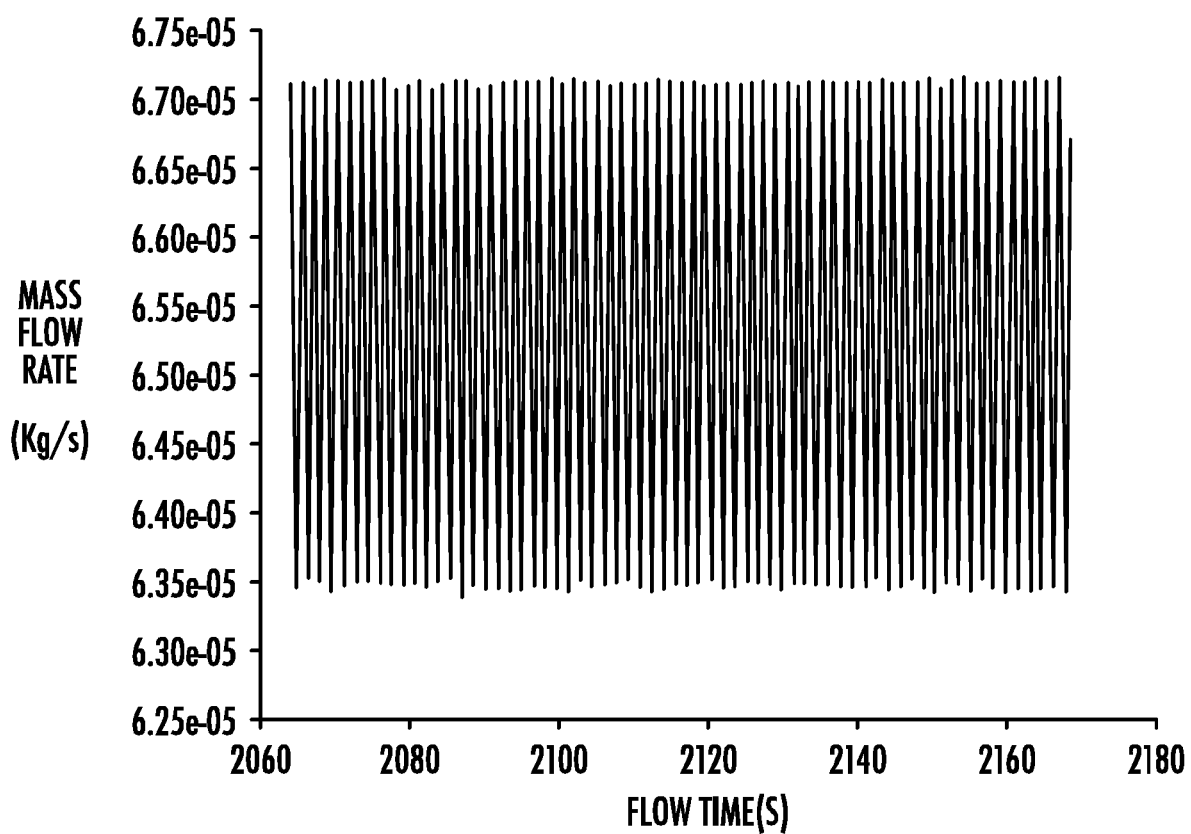
FIG. 4C is a plot of mass flow rate vs. flow time for the first comparative example.
Figure 4D:
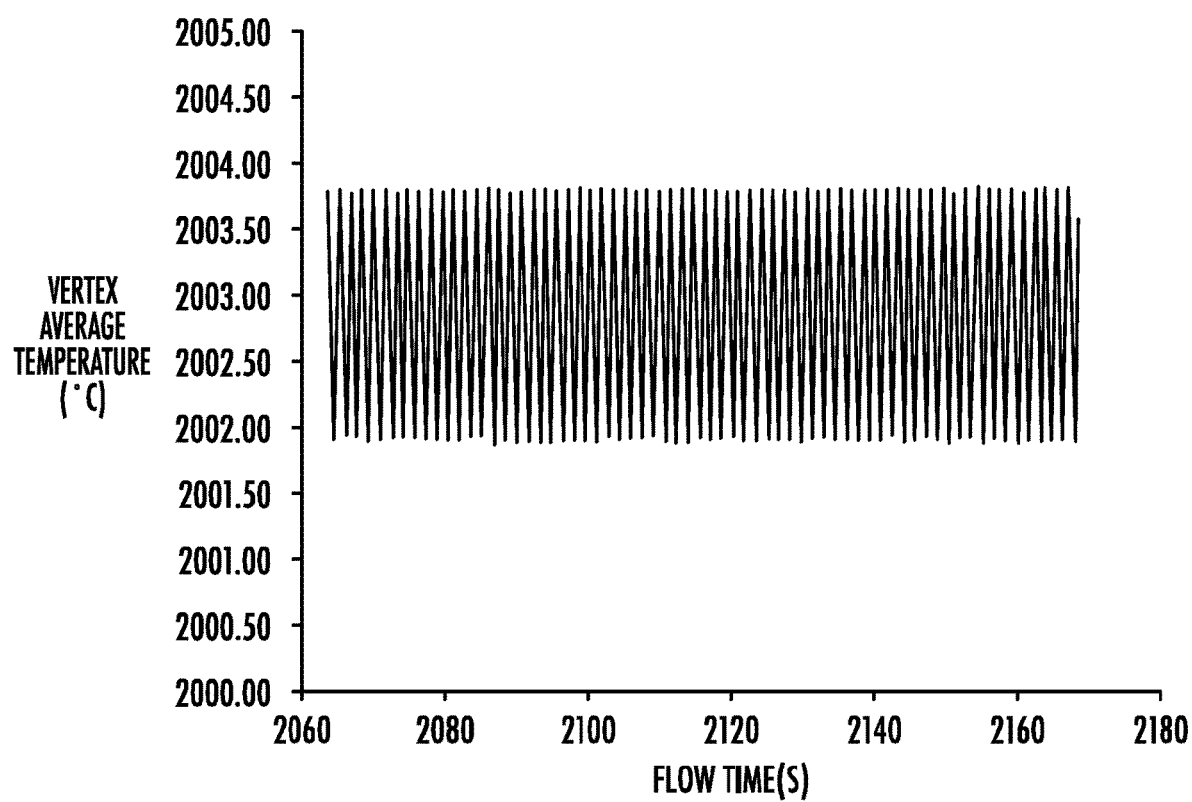
FIG. 4D is a plot of vertex average temperature vs. flow time for the first comparative example.

Referring now to FIG. 3, a method 70 of operating the furnace system 10 is depicted. The method 70 may begin with a step 74 of positioning the downfeed handle 42 within the upper muffle extension 30 such that the gap 46 is defined between the downfeed handle 42 and the upper muffle extension 30. As explained above, the downfeed handle 42 and/or boule 50 is configured to be inserted and removed from the upper muffle extension 30 and/or muffle 14 such that the optical fiber preform 54 may be positioned in the hot zone 26 of the furnace assembly 10. As such, the optical fiber preform 54 is supported from the downfeed handle 42. The lower heater 22 may create the hot zone 26 within the furnace cavity 18 with the hot zone 26 having a temperature of about 1900° C. or greater. The gap 46 exists between downfeed handle 42 (including boule 50) and the inner surface of the upper muffle extension 30. As explained above, the gap 46 may be defined to have a length of from about 0.5 cm to about 2.5 cm between the downfeed handle 42/boule 50 and the upper muffle extension 30.

Next, a step 78 of heating the upper muffle extension 30 through the upper heater 58 coupled to the upper muffle extension 30 is performed. Heating of the upper muffle extension 30 heats the gap 46 to a temperature in the range of from about 800° C. to about 1100° C. By heating the gap 46 and/or handle cavity 34 of the upper muffle extension 30, the difference in temperature between the gap 46 and the hot zone 26 may be decreased. As explained above, heating of the gap 46, as well as tailoring of the length of the gap 46 may decrease or eliminate turbulence within the process gas.

Next, a step 82 of injecting the process gas through the gas screen 38 around the downfeed handle 42 is performed. As explained above, the process gas injected through the gas screen 38 around the downfeed handle 42 may include nitrogen, argon, other inert gases and/or combinations thereof. For example, step 82 may include injecting at least one of nitrogen and argon through the gas screen 38.

Finally, a step 86 of drawing the optical fiber 62 from the optical fiber preform 54 is performed. As the gap 46 is heated by the upper heater 58, the optical fiber 62 may exhibit a substantially uniform diameter. While some steps are described using language such as "next" that conveys order in some contexts, it is understood that the steps may occur continuously and simultaneously in the method described. For example, the muffle is heated (step 78), the gas is flowing (step 82), and the optical fiber is drawn (step 86) all at the same time.

Use of the presently disclosed furnace system 10 may offer a variety of advantages. First, the disclosure may allow for the elimination of helium within the furnace system 10. For example, by tailoring the length of the gap 46 and/or by using the upper heater 58, flow instabilities generated from multicellular convection paths may be eliminated while using inert gases which have a lower kinematic viscosity (e.g., nitrogen, argon, etc.) thereby eliminating the need to use helium while also maintaining appropriate fiber diameter specifications. Such a feature may be advantageous in reducing production costs associated with helium. Further, production downtime related to helium supply instability may also be eliminated. Second, by eliminating the use of helium, the use of helium reclaim systems, which may often result in defects on the optical fiber 62 and/or optical fiber breaks, may be eliminated. Such a feature may be advantageous in increasing the usable length of optical fiber 62 drawn from the optical fiber preform 54. Third, by making the boule 50 flush with the remainder of downfeed handle 42, such that the gap 46 remains substantially constant while the downfeed handle 42 and optical fiber preform 54 are inserted into the handle cavity 34 may reduce a beehive effect in the diameter of the optical fiber 62. The beehive effect is the tendency for the diameter of the optical fiber 62 to vary widely as the spacing between the boule 50 and upper muffle extension 30 dramatically changes as the downfeed handle 42 is inserted into the upper muffle extension 30 of conventional fiber draw towers. Fourth, the mechanically simple design of incorporating the upper heater 58 and tailoring the length of the gap 46 allows for an easy and convenient manner to effectively control the diameter of the optical fiber 62 drawn with the furnace system 10 while also allowing relatively cheaper inert gases to be used.

EXAMPLES

Referring now to FIGS. 4A through 7D, depicted are computational fluid dynamic (CFD) simulations of gas flow and heat transfer within a furnace assembly (e.g., the furnace system 10). The CFD simulations were validated using historical observations based on current production configurations to confirm their validity.

Referring now to FIGS. 4A-4D, depicted is a CFD model of a first comparative example. In Comparative Example 1, a temperature variation occurs along an axial dimension of the furnace 80 (e.g., similar to furnace system 10) with a heating zone (e.g., similar to the hot zone 26) of the furnace 80 having a temperature of about 2100° C. and a temperature of an upper portion 84 (e.g., similar to the handle cavity 34 and/or gap 46) being much lower at about 200° C. A handle 88 (e.g., similar to the downfeed handle 42) has an outside diameter of about 7.62 cm and an upper muffle 92 (e.g., similar to the upper muffle extension 30) has a larger inner diameter such that a spacing 96 (e.g., similar to the gap 46)

between the handle 88 and the upper muffle 92 is greater than about 4 cm. As can be seen from the flow path of FIG. 4A, a cellular flow pattern is established in the upper furnace volume in the spacing 96 between the handle 88 and the upper muffle 92. The flow pattern consists predominantly of large convection cells which drift upward opposite to gravity (e.g., due to convection) and interact with the opposing forced gas flow (e.g., the process gas) that is metered into the furnace from a gas inlet (e.g., the gas screen 38). The gas of the gas flow used in Comparative Example 1 is 100% helium. Closed lines of the flow paths depict recirculation flow patterns. The model shows that the overall flow becomes unstable due to the above-mentioned interaction between the two opposing flows which result in flow parameters like gas temperature, pressure and mass flow rate which fluctuate in time. The unstable flow is periodic with a distinct peak frequency of 0.63 Hz. The model results are in line with observations in manufacturing (i.e., fiber diameter control is within specification with a large handle whereas diameter variability is out of spec with a small handle). With the vortices that are produced, it can be seen from FIGS. 4B-D that the static pressure, mass flow rate and temperature of the gas flow impinging on a preform (e.g., the optical fiber preform 54) in the area of a fiber root (e.g., the draw root 62A) rapidly fluctuates with time. As explained above, the rapid fluctuation of pressure, flow rate and temperature may affect the final diameter of an optical fiber drawn from the preform.

Figure 5A:
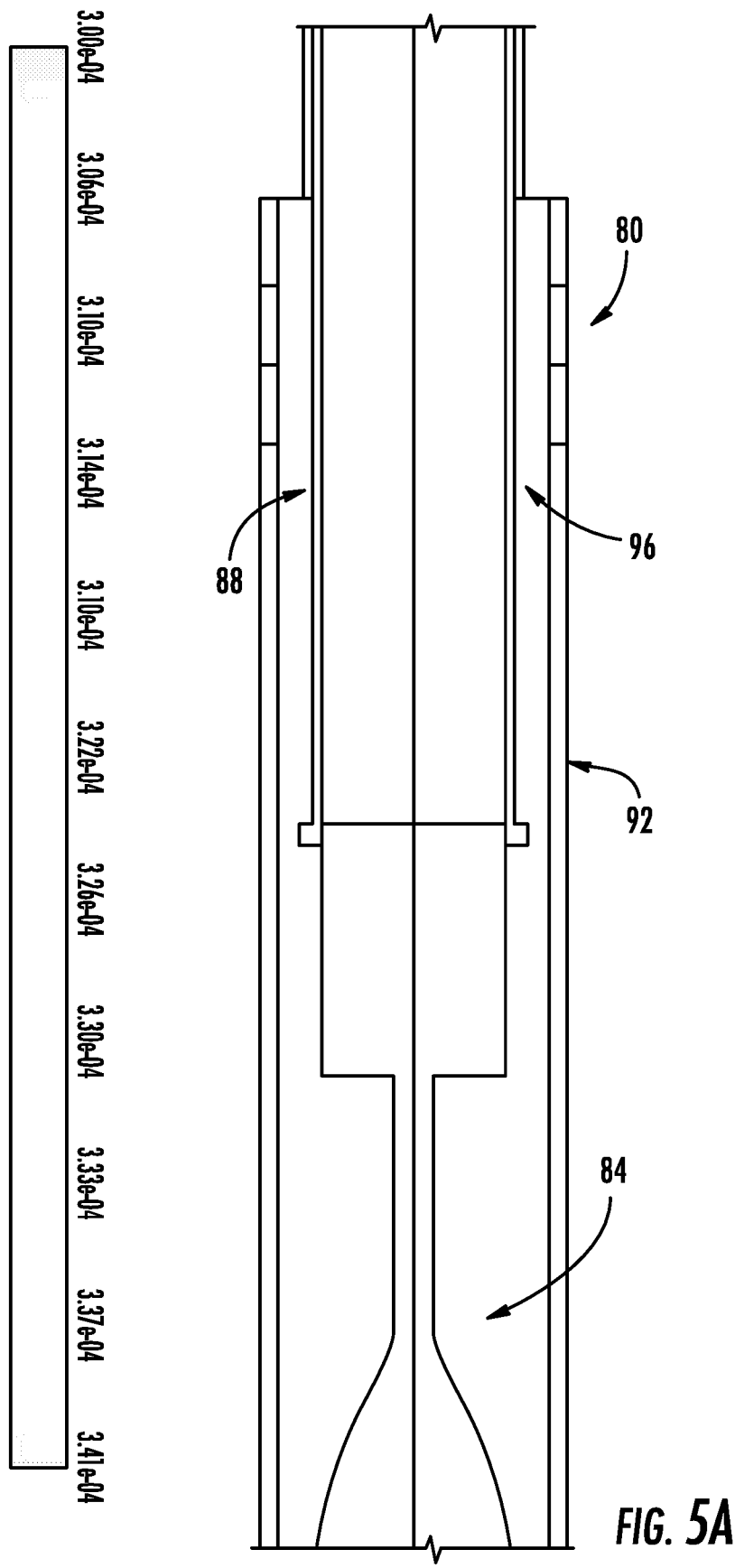
FIG. 5A is a flow path diagram for a first example.
Figure 5B:
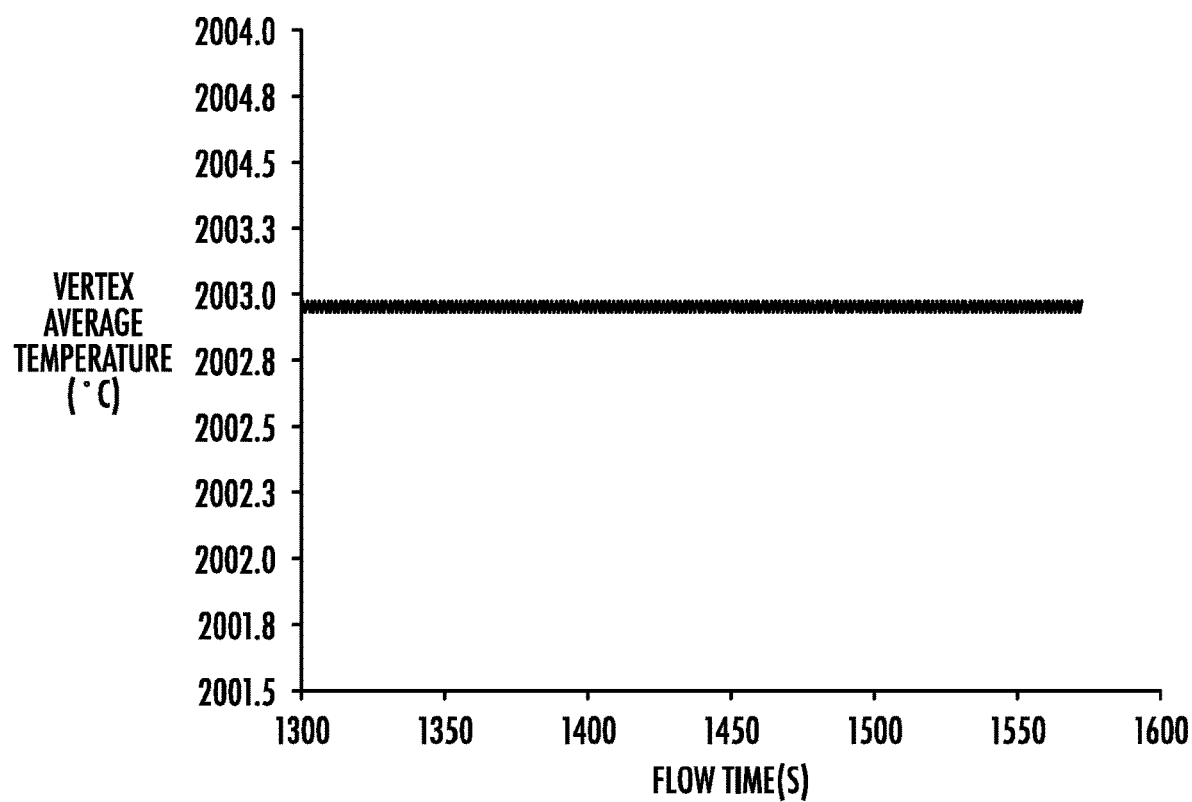
FIG. 5B is a plot of vertex average temperature vs. flow time for the first example.
Figure 6A:
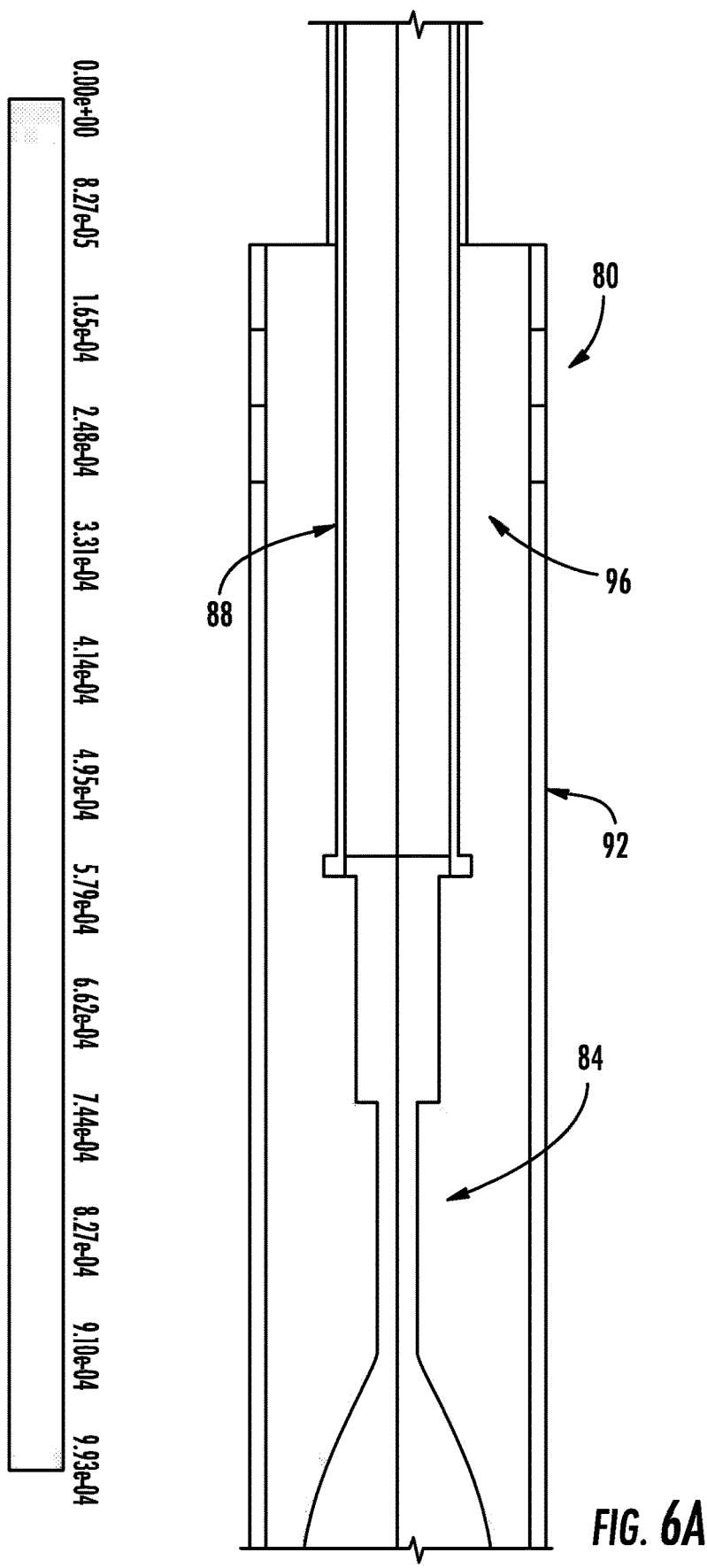
FIG. 6A is a flow path diagram for a second comparative example.
Figure 6B:
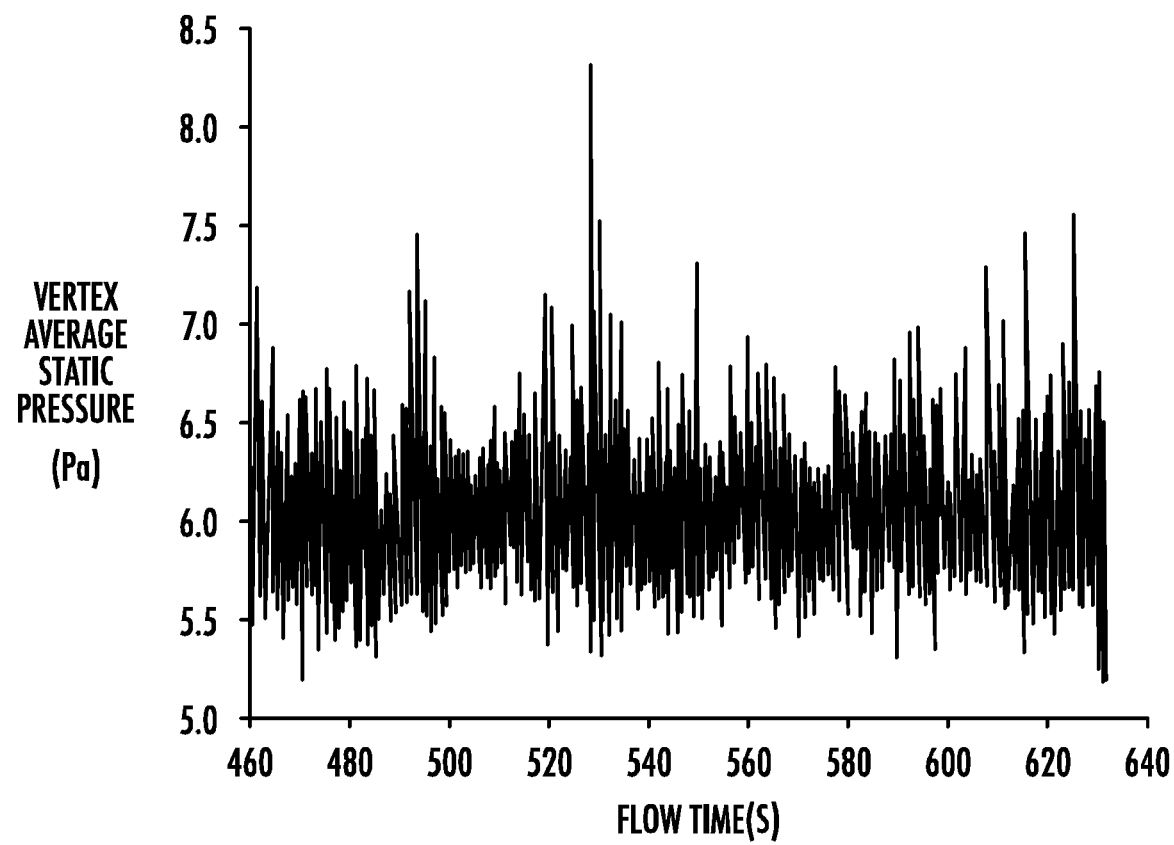
FIG. 6B is a plot of vertex average static pressure vs. flow time for the second comparative example.
Figure 6C:
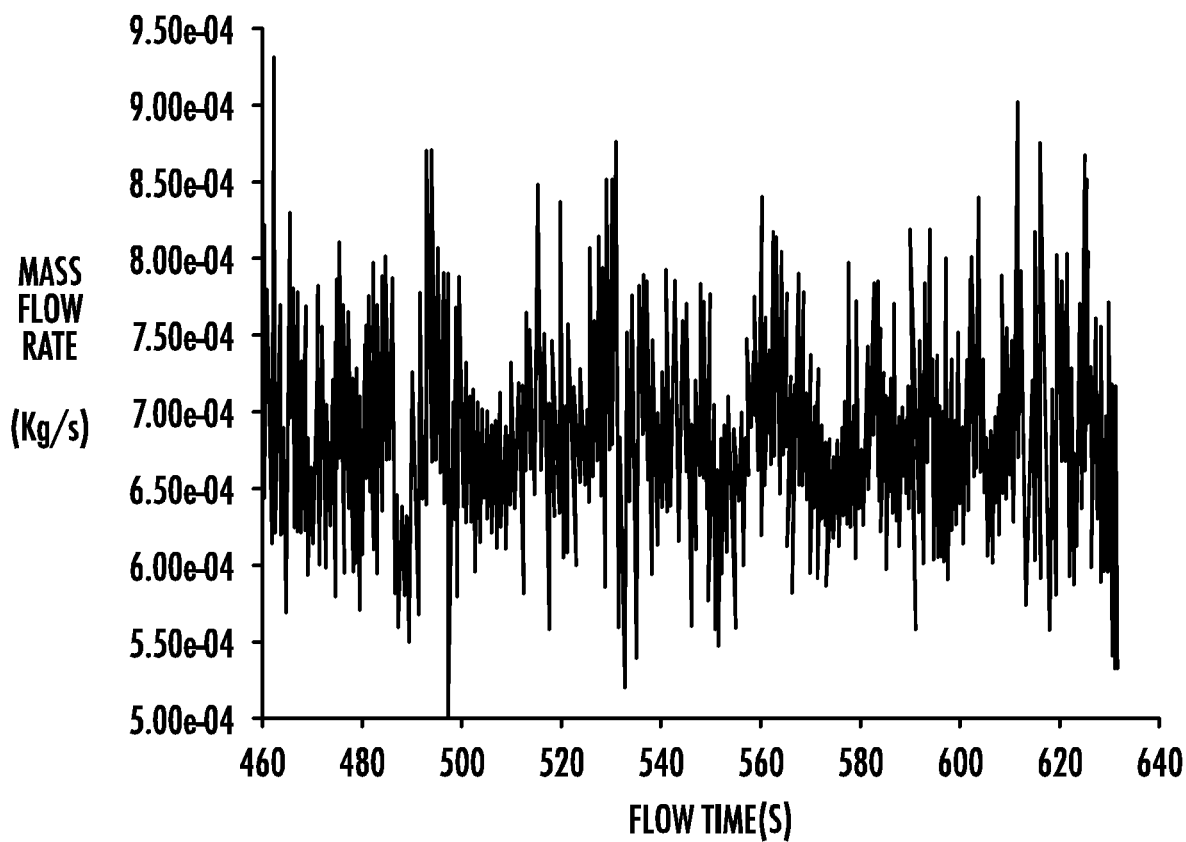
FIG. 6C is a plot of mass flow rate vs. flow time for the second comparative example.
Figure 6D:
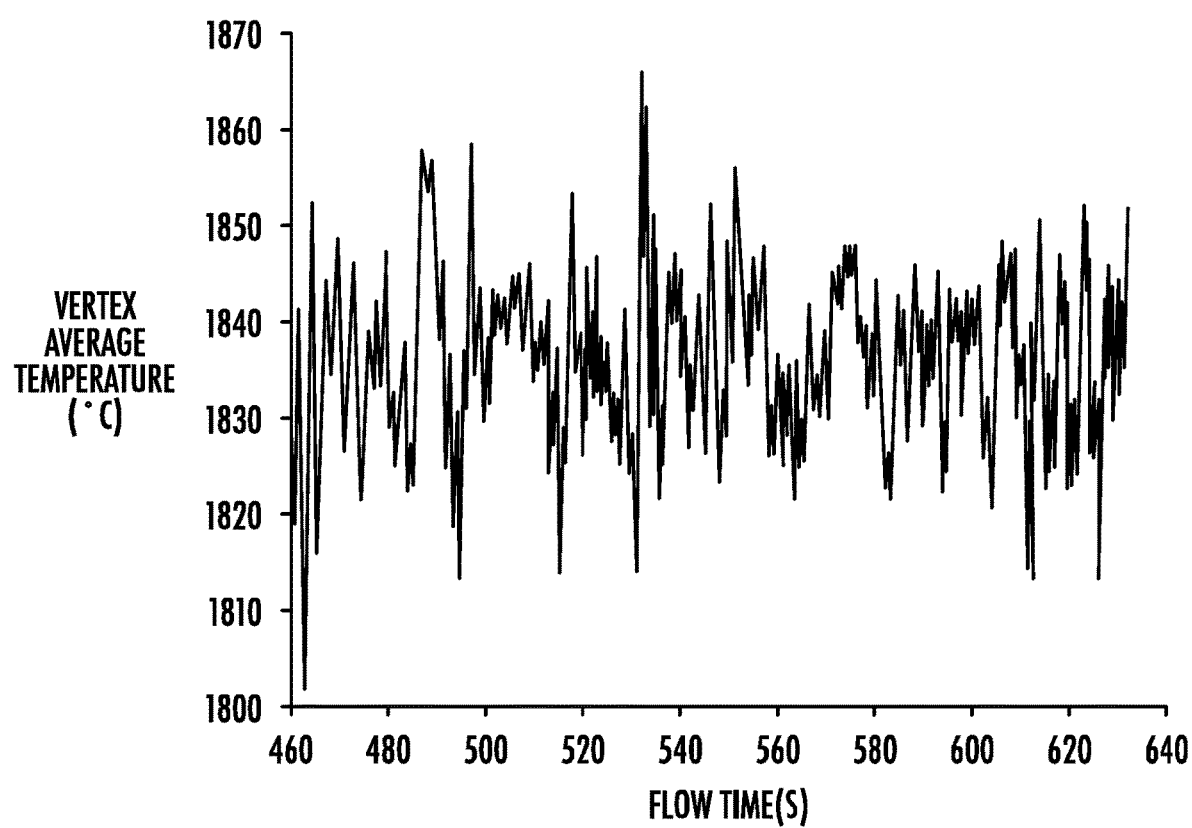
FIG. 6D is a plot of vertex average temperature vs. flow time for the second comparative example.
Figure 7A:
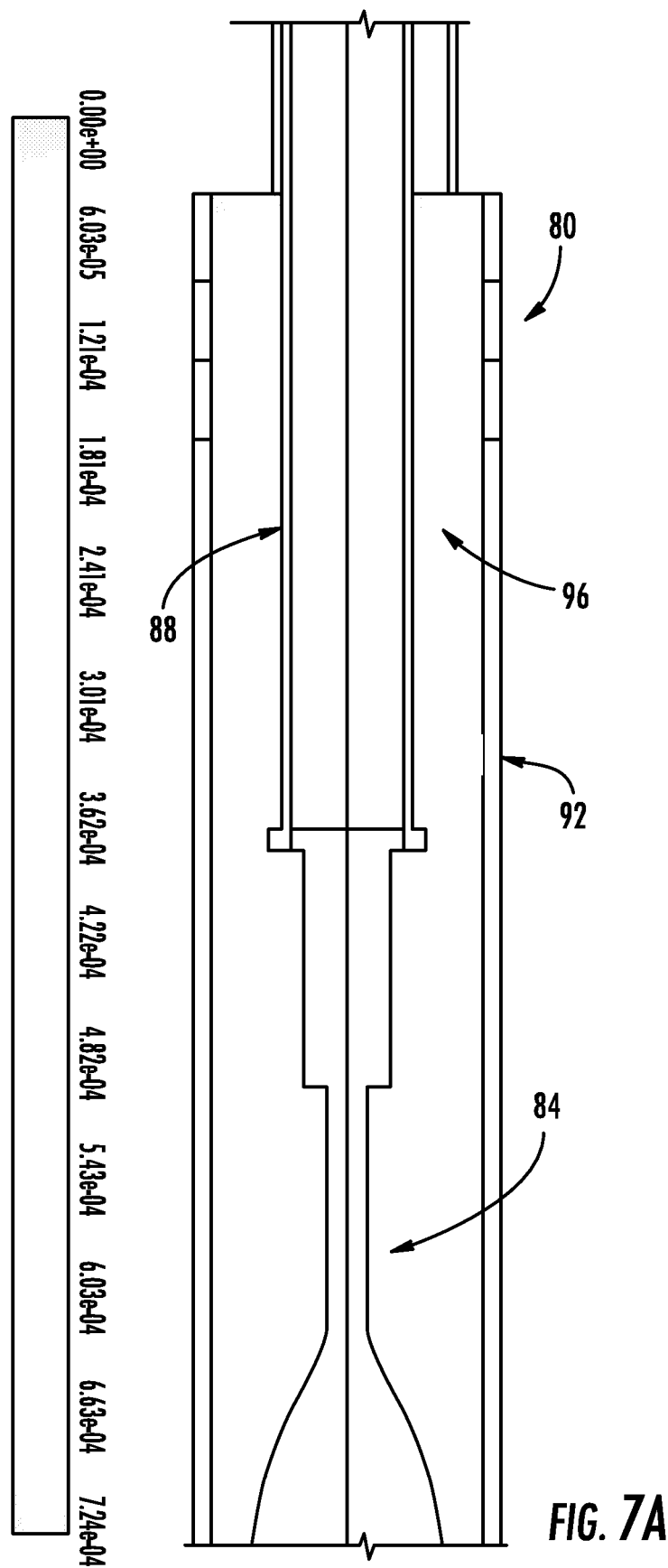
FIG. 7A is a flow path diagram for a second example.
Figure 7B:
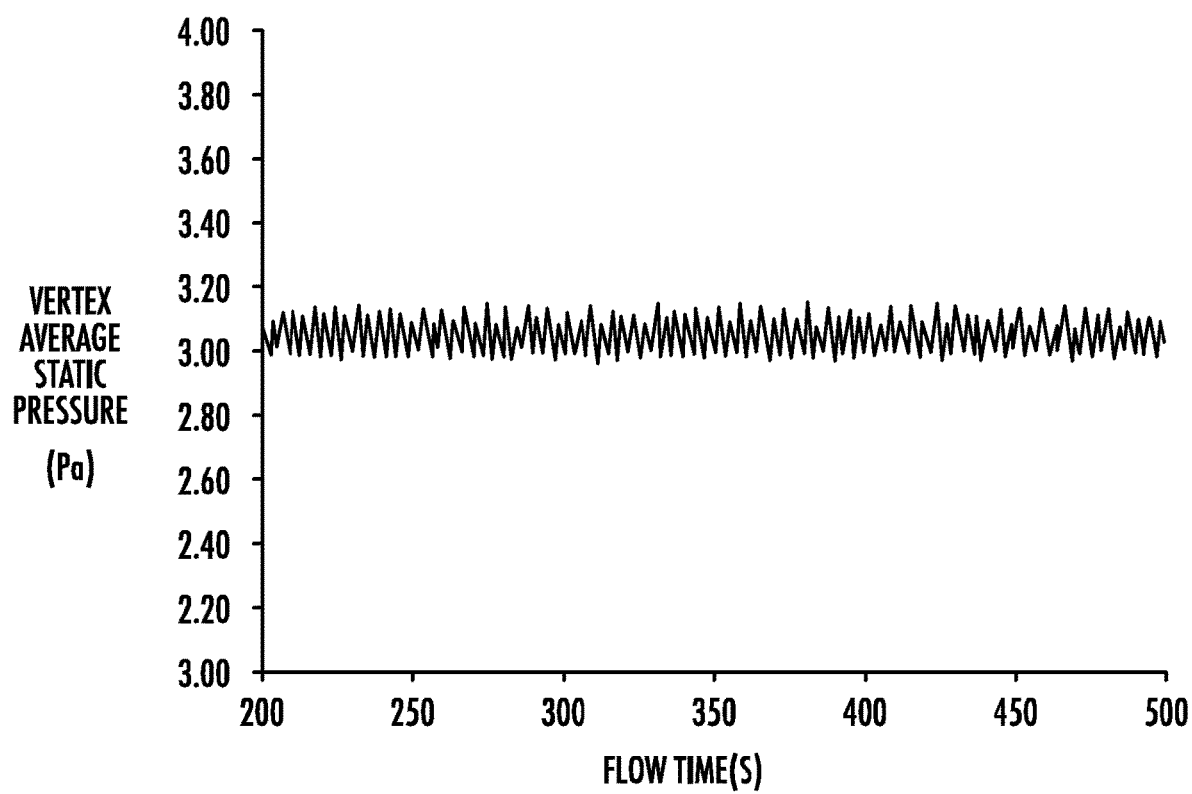
FIG. 7B is a plot of vertex average static pressure vs. flow time for the second example.
Figure 7C:
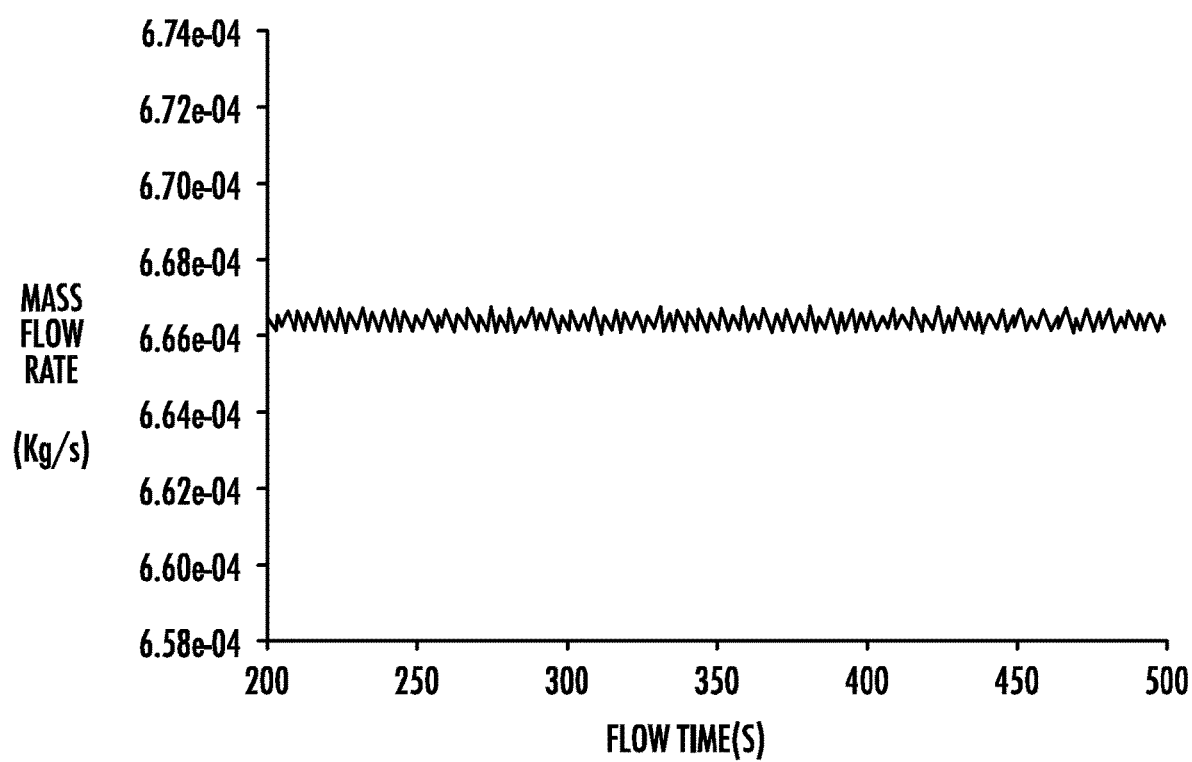
FIG. 7C is a plot of mass flow rate vs. flow time for the second example.
Figure 7D:
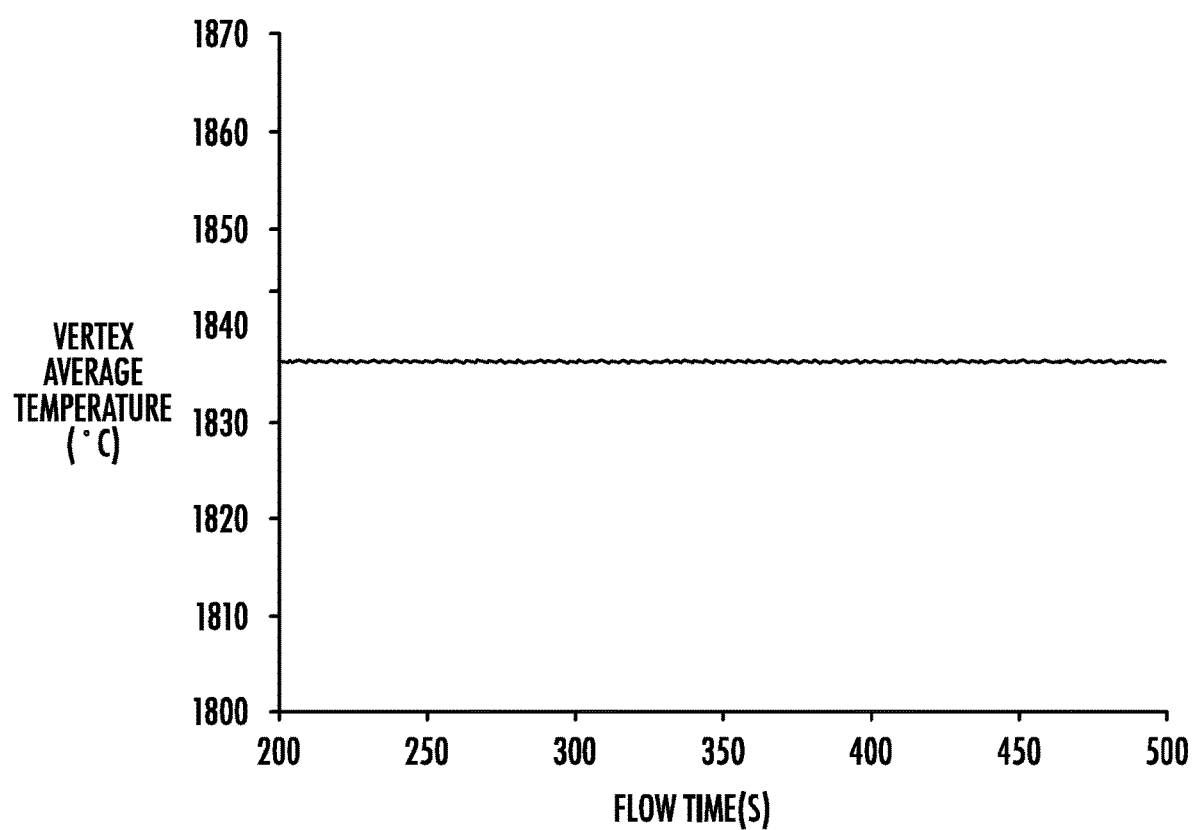
FIG. 7D is a plot of vertex average temperature vs. flow time for the second example.

Referring now to FIGS. 5A and 5B, depicted is a first example of the present disclosure. In Example 1, the conditions of the furnace 80 are the same as in Comparative Example 1, but the handle 88 has an outside diameter of about 12.37 cm and an upper muffle 92 has a small inner diameter such that the spacing 96 between the handle 88 and the upper muffle 92 is about 4 cm or less. As seen in FIG. 5A, when the spacing 96 is small, the flow of the gas from the gas screen inlet is predominantly downward with only two small recirculation vortices formed near the inlet of the gas due to the gas entering the furnace 80 perpendicular to the upper muffle 92. As shown in FIG. 5B, the temperature of the gas impinging on the preform in the region of the fiber root (e.g., at the draw root 62A of the preform 54 where the optical fiber 62 is drawn) is very stable with time. As explained above, the stable temperature results in a stable heat transfer which produces an optical fiber having a consistent diameter.

Referring now to FIGS. 6A-6D, a Comparative Example 2 is depicted having the same process parameters of Comparative Example 1, except helium is replaced with argon. As can be seen from the figures, the replacement of helium with argon results in the establishment of a multicellular convective in an upper portion 84 of the furnace 80. Moreover, the nature of the flow instability changes from periodic in Comparative Example 1 to irregular, or chaotic, in Comparative Example 2. For example, when the furnace gas is 100% helium, the unstable flow is periodic with a distinct peak frequency of 0.63 Hz whereas when the draw furnace gas is 100% argon, the fluctuation does not have a frequency. As explained above, the lower kinematic viscosity of argon results in a greater Grashof number, relative to helium, resulting in a greater instability of the gas flow. The increased instability results in rapid and chaotic fluctuation of pressure, flow rate and temperature.

Referring now to FIGS. 7A-7D, the figures depict CFD modeling of an Example 2 of the present disclosure. As explained above, one method of suppressing flow instabilities is to actively heat the upper muffle 92 above the heating zone. By heating the upper muffle 92 above the heating zone, the Grashof number may be reduced by decreasing the value of $\beta/\nu^2$ as well as the temperature difference between the heating zone and the upper portion of the furnace 80. For example, the same value of $\beta/\nu^2$ (i.e., the same Grashof number) in the upper portion of an argon-filled furnace can be obtained as with a mixture of 95% helium/5% argon if the argon-filled upper muffle 92 is heated to about 1100° C. using a top heater (e.g., structure similar to the upper heater 58). When the upper muffle 92 is heated to 1100° C., the argon kinematic viscosity is one order of magnitude larger than when the upper muffle 92 above the heating zone is not actively heated. From Equation (1), it can be inferred that the Grashof number will be at least two orders of magnitude smaller and therefore it can be expected that the magnitude of natural convection will be diminished. It will be understood that temperatures lower than 1100° C. (e.g., down to about 700° C.) or greater than 1100° C. (e.g., up to the temperature of the hot zone 26) may also be utilized to achieve a similar effect. Indeed, a comparison of the flow path contour plots of Comparative Example 2 and Example 2 shows that by heating the upper muffle 92 of the furnace 80, suppression of the multicellular convection in the spacing 96 between the upper muffle 92 and the handle 88 occurs and the argon gas flow is predominantly from the top towards the heating zone and is stable. The effect of heating the upper muffle 92 on stabilizing the flow can be clearly seen from a comparison of the transient profile of flow parameters, temperature, pressure and mass flow rate presented in FIGS. 7B-7D. The temporal stability of the flow, temperature and pressure results in a stable cooling of the root, yielding stable fiber diameter performance.

Figure 9:
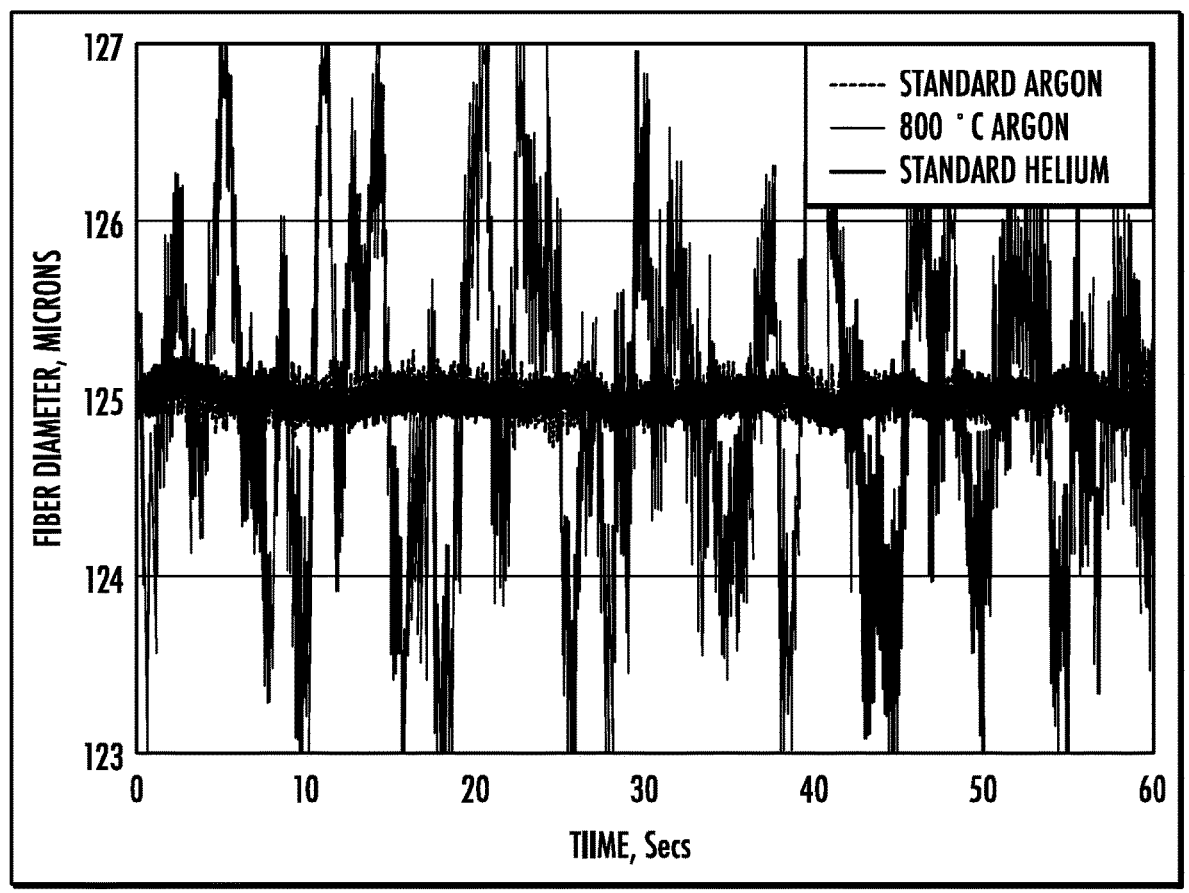
FIG. 9 shows fiber diameter where different gases are used.

Referring to FIG. 9, the figure shows fiber diameter, collected at a frequency of 500 Hz, for three cases where the furnace geometry and draw parameters are identical. The gap between downfeed handle and upper muffle in these three cases was maintained at 12 mm. In the first case, Standard Argon, there is no additional heating of the upper muffle, and the fiber diameter variability is large and unacceptable. In the second case, Standard Helium, again there is no additional heating of the upper muffle, but the large kinematic viscosity of helium results in fiber diameter that is well controlled and meets specification standards. In the third case, 800° C. Argon, the upper muffle was heated to 800° C. resulting in an increase in kinematic viscosity for Argon and a fiber diameter that is well controlled and meets specification standards.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A method of operating a furnace assembly, the method comprising:
    positioning a downfeed handle within an upper muffle extension such that a gap is defined between an outer surface of the downfeed handle and an inner surface of the upper muffle extension;
    heating the upper muffle extension through an upper heater thermally coupled to the upper muffle extension such that the gap is heated to a temperature in the range between about 800° C. and about 1800° C.; and
    injecting a process gas through a gas screen around the downfeed handle.

2. The method of claim 1, wherein the step of injecting a process gas further comprises:
    injecting at least one of nitrogen and argon through the gas screen around the downfeed handle.

3. The method of claim 1, further comprising the step of:
    creating a hot zone within a furnace cavity of the furnace assembly, the hot zone having a temperature of about 1900° C. or greater.

4. The method of claim 1, further comprising the steps of:
    supporting an optical fiber preform from the downfeed handle; and
    drawing an optical fiber from the optical fiber preform.

5. The method of claim 1, wherein the gap has a length from about 0.5 cm to about 2.5 cm between an outer surface of the downfeed handle and the inner surface of the upper muffle extension.

6. The method of claim 1, wherein the gap has a length of about 4 cm or less between an outer surface of the downfeed handle and the inner surface of the upper muffle extension.

* * * * *

UNITED STATES PATENT AND TRADEMARK OFFICE
CERTIFICATE OF CORRECTION

| | |
|---|---|
| PATENT NO. | : 11,554,980 B2 |
| APPLICATION NO. | : 17/470499 |
| DATED | : January 17, 2023 |
| INVENTOR(S) | : Erling Richard Anderson et al. |

It is certified that error appears in the above-identified patent and that said Letters Patent is hereby corrected as shown below:

On the Title Page

On the page 2, in Column 1, item [56], Line 3, below "22, 2018." insert -- Foreign Application Priority Data May 1, 2018 (NL) ................ 2020854 --, as a new field entry.
On the page 2, in Column 2, item [56], Line 11, delete "Writien" and insert -- Written --.

Signed and Sealed this
Eighteenth Day of July, 2023

Katherine Kelly Vidal
*Director of the United States Patent and Trademark Office*